(12) United States Patent
Scott et al.

(10) Patent No.: US 7,956,104 B2
(45) Date of Patent: Jun. 7, 2011

(54) CENTERPORT INHIBITOR FOR A SOLID PROPELLANT ROCKET MOTOR, A SOLID PROPELLANT ROCKET MOTOR INCLUDING SAME, AND A METHOD OF INHIBITING A CENTERPORT OF A SOLID PROPELLANT ROCKET MOTOR

(75) Inventors: Matthew S. Scott, Ridgeley, WV (US); Carl Shanholtz, Fort Ashby, WV (US); David Shields, Ridgeley, WV (US); Dayne Lancaster, Frostburg, MD (US)

(73) Assignee: Alliant Techsystems Inc., Minneapolis, MN (US)

( * ) Notice: Subject to any disclaimer, the term of this patent is extended or adjusted under 35 U.S.C. 154(b) by 1949 days.

(21) Appl. No.: 10/369,488

(22) Filed: Feb. 24, 2003

(65) Prior Publication Data

US 2009/0139205 A1    Jun. 4, 2009

(51) Int. Cl.
*C06B 23/00*    (2006.01)
*C06B 21/00*    (2006.01)
*C09K 3/00*    (2006.01)
*F02K 9/00*    (2006.01)

(52) U.S. Cl. .................... 523/180; 252/183.11; 264/3.1; 60/253

(58) Field of Classification Search ............. 252/183.11, 252/183.1; 264/3.1; 60/253; 523/180
See application file for complete search history.

*Primary Examiner* — Jerry Lorengo
(74) *Attorney, Agent, or Firm* — TraskBritt

(57) ABSTRACT

A pourable opaque centerport for solid propellant rocket motors and method for applying the same are disclosed. The pourable centerport inhibitor for solid propellant rocket motors has a curing system that includes a prepolymer and a curing agent. The prepolymer and the curing agent are combined to form a pourable polymeric binder that cures into an amorphous solid. The pourable centerport inhibitor also includes an opaque agent. The pourable centerport inhibitor may also include a plasticizer. The plasticizer, the prepolymer, and the curing agent are preferably the same type that is in the solid propellant with which it will be used in conjunction.

12 Claims, 1 Drawing Sheet

CENTERPORT INHIBITOR FOR A SOLID PROPELLANT ROCKET MOTOR, A SOLID PROPELLANT ROCKET MOTOR INCLUDING SAME, AND A METHOD OF INHIBITING A CENTERPORT OF A SOLID PROPELLANT ROCKET MOTOR

TECHNICAL FIELD

The technical field includes solid propellants and, more specifically, the centerport inhibitor of a solid propellant rocket motor.

BACKGROUND

Solid propellant charges for rocket motors are typically cast to provide a tubular shape that includes a centerport. A centerport is a hollow channel positioned in the approximate center of propellant charge that extends axially throughout the length of the tubular shaped propellant. Generally, a centerport is included to provide stress relief to the cured propellant. A completely solid propellant with no centerport has a strong tendency to form cracks when subjected to changes in temperature. Cracks in the propellant charge are undesirable because cracks will typically cause an uneven burn at the ground base. To avoid the formation of these uncontrolled cracks, a centerport is included. For reasons well known in the art, it is important to protect the centerport from burning during the firing of the propellant. A centerport inhibitor protects the propellant at the inside surface of the centerport from exposure to the flames and/or heat from the burn that is occurring at the ground base of the propellant. This is typically accomplished by utilizing an inhibiting medium, sometimes referred to as a centerport inhibitor.

Traditional centerport inhibitors involve the installation and bonding of an inert material to the centerport, sometimes referred to as a rubber boot. Traditional rubber boots are basically pre-formed, cured rubber sleeves. Both the use and installation of a rubber boot to the centerport has many drawbacks. First, because they are pre-cured, installation of a traditional rubber boot into a centerport is difficult and labor intensive. The installation of a rubber boot is accomplished by one of two ways: either the rubber boot is placed into the centerport of a cured solid propellant and glued into place using an adhesive. Alternatively, the rubber boot can be placed around the tooling of a propellant mold prior to casting the liquid pre-cured propellant and, thereafter, curing the propellant with the rubber boot already in position. In many instances, a third material must be included as part of the installation of the rubber boot, e.g., an additional barrier coat is applied between the glue or adhesive and the propellant in order to prevent the glue or adhesive from leaching into the propellant at the inside surface of the centerport.

Another drawback to the pre-cured rubber boot centerport inhibitor is its tendency to de-bond from the propellant to which it is glued or adhered. When a de-bond of the rubber boot occurs, flames and/or heat may reach the area of the propellant that the inhibitor is designed to protect, specifically the inner surface of the centerport. If the walls of the centerport ignite, the rocket is negatively impacted. At a minimum, this negatively impacts the operation of the rocket motor. However, there is a possibility that such an occurrence may cause the motor to explode.

Therefore, there is a need for a centerport inhibitor that overcomes the disadvantages of prior centerport inhibitors.

There is a need for a centerport inhibitor that is easily applied to a cured propellant charge that bonds chemically to the surface of the centerport.

SUMMARY

A pourable opaque centerport for solid propellant rocket motors and a method for applying the same has a curing system that includes a prepolymer and a curing agent. These ingredients are combined to form a pourable polymeric binder that cures into an amorphous solid. The pourable centerport inhibitor also includes an opaque agent and may also include a plasticizer. The plasticizer, prepolymer, and the curing agent are preferably made up of the same type that is in the solid propellant.

A method of inhibiting the centerport of a solid propellant rocket motor includes pouring a predetermined amount of pourable inhibitor into the centerport of a solid propellant rocket motor and rotating the solid propellant rocket motor in a substantially horizontal position for a period of time that allows the inhibitor to cure. A chemical bond forms between the centerport inhibitor and the solid propellant as the inhibitor cures. The steps of the method may be repeated one or more times depending on the desired thickness of the centerport inhibitor.

A solid propellant rocket motor with an inhibited centerport has a rocket motor case, a solid propellant with a centerport, and a chemically bonded centerport inhibitor. The solid propellant is positioned inside the rocket motor case and the pourable centerport inhibitor is applied to the surface of the centerport of the solid propellant and cured. The pourable centerport inhibitor and the solid propellant have compatible cure systems and preferably utilize the same cure systems. Specifically, the cure system may be hydroxy terminated polybutadiene and a multifunctional, isocyanate. The solid propellant and the pourable centerport system may utilize the same cure systems and same plasticizers. The plasticizer in, the propellant and inhibitor is preferably the same concentration on a rubber-to-rubber basis.

Other aspects and advantages will become apparent from the following detailed description, taken in conjunction with the accompanying figures.

BRIEF DESCRIPTION OF THE DRAWING

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION

Figure 1:
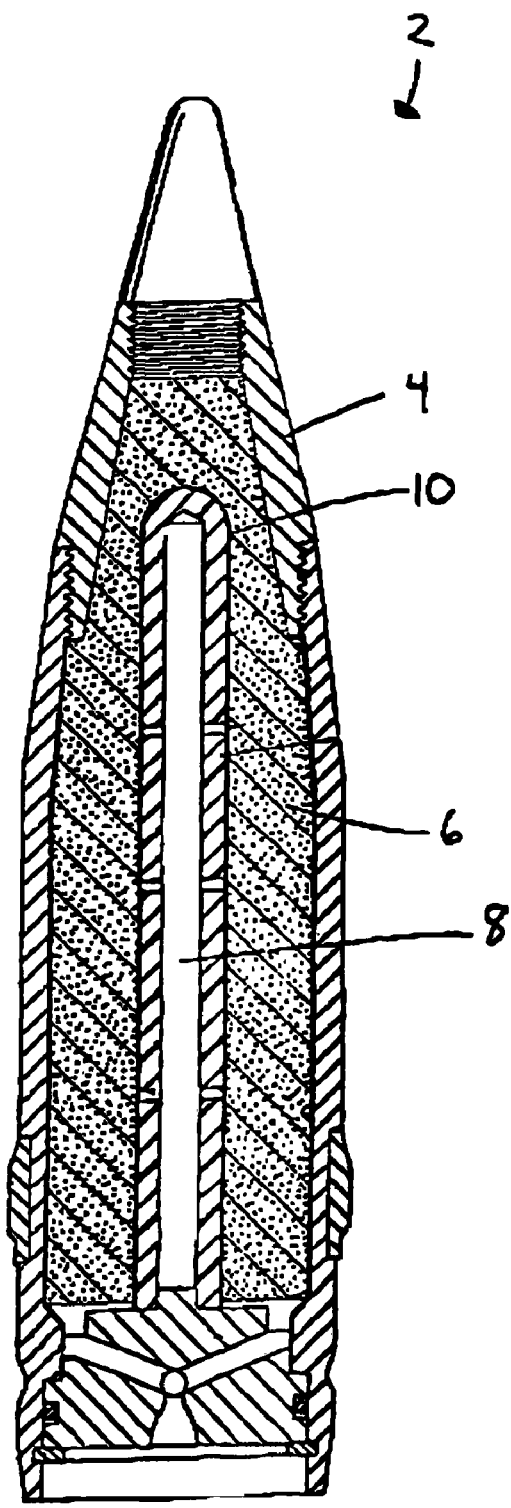
FIG. 1 is a schematic illustration of a solid propellant rocket motor.

A centerport inhibitor of a solid propellant rocket motor that is pourable and bonds to the propellant, and a method for applying the same is disclosed. The inhibitor is formulated so that it has pourable consistency prior to curing and is a soft amorphous solid after it cures. As used throughout this specification, the term "pourable" refers to a substance that is in a physical state that allows the substance to be poured. In most instances, a pourable substance is a liquid; however, pourable is not limited to any specific viscosity range or state of matter. The inhibitor formulation also contains at least one ingredient to impart opaqueness. A predetermined amount of pourable centerport inhibitor is poured into the centerport of a solid propellant rocket motor unit. The unit is rotated for a period of time while the centerport inhibitor cures and bonds to the propellant surface. Additional coats may be applied as required.

The specific formulation of the present invention varies and is dependent on the specific formulation of the solid propellant to which it will be applied. Generally, the formulation of the present invention is made up of a polymeric binder base that is pourable in its uncured state. In the uncured state, the binder is preferably a two part chemical curing system. The first part is a liquid or semi-liquid prepolymer. The second part is a curing agent. Upon cure, the curing agent reacts with functional moieties on the prepolymer to form crosslinks that harden the material.

Additional ingredients may include one or more of the following: antioxidants; peroxide scavengers; pigment or opaque agents; cure catalysts; plasticizers; and, reinforcing agents. These ingredients are well known in the art and may be added to impart a specific property to the inhibitor either prior to curing or to meet certain hardness or other physical or mechanical characteristics as required by the specific rocket motor. Also, these or other ingredients may be added for processability purposes.

The centerport inhibitor of the present invention bonds to the surface of the solid propellant when it cures. Therefore, the specific ingredients of the formulation are chosen to be compatible with the formulation of solid propellant. Most importantly, the specific polymeric binder or cure system, i.e., prepolymer/curing agent combination, is chosen to be compatible with the corresponding polymeric binder present in the solid propellant. For example, if the solid propellant contains a hydroxy substituted polybutadiene prepolymer, such as hydroxy terminated polybutadiene ("HTPB"), then the inhibitor formulation preferably utilizes a hydroxy substituted polyester as the prepolymer. And, more preferably, the inhibitor formulation contains the identical hydroxy substituted polybutadiene, i.e., HTPB. However, different prepolymers may bond with the propellant and, therefore, may be compatible and used in the corresponding inhibitor formulation. Similarly, curing agents are chosen to be compatible with the propellant formulation to further ensure that bonding occurs between the inhibitor and propellant. Additionally, plasticizers are often included in propellant formulations to improve the flexibility; therefore plasticizers are preferably included in the inhibitor formulations. The type and amount of plasticizer in an inhibitor formulation is dependant on the type and amount in the propellant formulation.

Table 1 illustrates one example of a formulation of the invention. This formulation is designed to be used in conjunction with a specific propellant formulation. Brand names of certain ingredients are identified in parenthesis. Alternatives, substitutions and omissions may be made to each of the specific ingredients of the example and are known to those skilled in the art. A non-exhaustive list of possible substitutions or alternatives is included in the chart.

TABLE 1

| Description | Ingredient | Percentage by weight | Possible Substitutions or alternatives |
|---|---|---|---|
| Prepolymer | hydroxy terminated polybutadiene (R45M) | 54.58 | 45HT or HYCAR |
| curing agent | multifunctional isocyanate (N-100) | 7.85 | Di, tri or Polyfunctional isocyanate isocyanate curing agents - |

TABLE 1-continued

| Description | Ingredient | Percentage by weight | Possible Substitutions or alternatives |
|---|---|---|---|
| | | | isophonone diisocyanate "IPDI," dimeryl diisocyanate "DDI," ethylenediisocyanate "HDI," PAPI-20 |
| Cure catalyst | dibutyltin dilaurate "DBTDL" | 0.04 | dibutyl tin diacetate "DBTDA," triphenyl bismuth "TPB" |
| Antioxidant | 2,2-methylenebis-(4-methyl-6-tert-butyl-phenol) (AO-2246) | 0.11 | |
| Peroxide Scavenger | trinonylphenylphosphite (POLYGARD ®) | 0.04 | |
| Reinforcing agent | untreated fumed silicon dioxide (CAB-O-SIL ®) | 5.49 | titanium dioxide, carbon black |
| Opaque agent | Zinc oxide | 15.0 | pigment, carbon black |
| Plasticizer | dioctylsebacate "DOS" | 16.8 | Dioctyladipate "DOA," isodecylperlargonate "IDP," dioctylphthalate "DOP" |

The relative amounts of each ingredient result in an inhibitor with specific physical and mechanical properties. The weight percent of each ingredient may be adjusted upward or downward to achieve different physical or mechanical properties. In some instances, ingredients may be omitted entirely. The pourable inhibitor formulation in the above example is designed to be applied to a solid propellant centerport with a polymeric binder formed from an HTPB prepolymer and a multifunctional isocyanate curing agent.

The specific polymeric binder and plasticizer match the particular polymeric binder and plasticizer in the propellant for which it is prepared. The HTPB prepolymer has an OH functionality of 2 to 3 and a specific average molecular weight of less than 10,000, preferably 1,000 to 5,000 and, ideally, around 3,000. Illustrative commercial and military grades of HTPB prepolymer are R45M and R45HT. The number "45" refers to the approximate number of diene units in the polymer chain. These products have a viscosity that is roughly similar to motor oil. 45HT or HYCAR are suggested alternatives, but other hydroxyl substituted polymers could be used.

If a different polymeric binder is present in the propellant then a corresponding, prepolymer is preferable. Examples of common alternative prepolymers include butadiene-acrylonitrile-acrylic acid terpolymer ("PBAN") and carboxy terminated polybutadiene ("CTPB").

The specific curing agent is dependent on the other ingredients used in the formulation. The curing agent in the example formulation is a multifunctional isocyanate. Suitable multifunctional isocyanates include di-, tri- and polyfunctional isocyanates, such as isophorondiisocyanate ("IPDI"), dimeryldiisocyanate (DDI), ethylenediisocyanate ("HDI"), and methylene diphenyl diisocyanate ("MDI") polymer products, such as PAPI-20. Preferably diisocyanates are used, such as N100. Curing occurs when the HTPB reacts with the multifunctional isocyanate to form urethane crosslinks, which hardens the inhibitor into an amorphous solid.

Additionally, urethane crosslinks form between the inhibitor and the propellant at available sites at the surface of the centerport. This results in the inhibitor being chemically bonded to the propellant. This is the reason why the inhibitor is formulated to be chemically compatible with the propellant. A centerport inhibitor that is chemically bonded to the surface of the centerport is less apt to detach from the centerport.

If a different prepolymer is used, such as a CTPB, then a different curing agent is suitable, such as an epoxy. Again, this type of substitution would be preferable if a similar prepolymer/curing agent combination is present in the propellant formulation for which the inhibitor is being prepared. Those skilled in the art are familiar with the types of curing agents that are suitable to be paired with different prepolymers for curing and will be able to make appropriate substitutions.

Given sufficient time, curing occurs at ambient temperature. However, curing is generally accelerated by the application of heat and/or pressure and sometimes with a cure catalyst.

The cure catalyst effects the cure rate of the inhibitor. DBTDL is used in the example formulation because it results in an inhibitor with a desirable cure rate that will sheet out or spread evenly across the surface of the propellant. Similarly, the relative amount of cure catalyst is chosen to achieve a specific result. If, in a given application, the cure rate is unimportant, the cure catalyst may be omitted. Alternatively, if a rapid cure is desired, the relative amount of cure catalyst may be increased. In the above formulation, other cure catalysts may be used, such as DBTDN or TPB, while still achieving the desired cure rate.

The antioxidant and peroxide scavenger are added to the example formulation to prolong the shelf life of the inhibitor. A typical shelf life ranges from one to ten years. Shelf life is an important property, especially in military applications, where weapons are generally procured and stockpiled long before use. However, these ingredients, although desirable, may be omitted if prolonging the shelf life is not important to the specific application.

The reinforcing agent is added to strengthen the inhibitor. Depending on the formulation and specific application, more or less reinforcing agent may be added or omitted altogether. In many rocket applications, the inhibitor needs to be relatively soft so that it can be expelled through the rocket motor nozzle during the burn of propellant. In many applications, if the inhibitor is too hard, the inhibitor can potentially clog the rocket motor nozzle during the burn. The amount of reinforcing agent used in the example formulation results in an inhibitor that is soft enough to be expelled through the rocket motor nozzle by the combusting propellant. A preferred filler, CAB-O-SIL®, is a synthetic, amorphous, untreated fumed silicon dioxide made by Cabot Corporation. When mixed into liquid resin; CAB-O-SIL® functions as a resin thickener (flow control agent) and sometimes as an anti-settling, anti-caking agent. CAB-O-SIL® is an extremely fine particle size silica (silicon-dioxide/$SiO_2$) aerogel. It is pure white and free-flowing.

An opaque agent, as used in this specification, refers to a substance that reduces or prevents the transfer of heat. Opaque agents are often added to the inhibitor to reduce heat transfer into the propellant at the surface of the centerport. Inhibiting heat transfer at the centerport facilitates the rocket motor to function as an end burning rocket motor. Zinc oxide is the preferred opaque agent because it imparts a high degree of opaqueness to the inhibitor, although other opaque agents may be used, including some pigments. The type of opaque agent used and the amount required is not critically important as long as it performs the function of reducing the heat transfer into the propellant to the extent required by the specific application. In the example formulation, 1.5% is preferred, but adequate opaqueness would be achieved with as little as 5%. Alternatively, as much as 50% could be used in the example formulation while still maintaining the desired physical and mechanical properties. At some point above 50%, the opaque agent may adversely impact the viscosity of the liquid inhibitor and result in a paste-like substance that is not pourable. Additionally, too much opaque agent may result in a cured inhibitor that is too hard. These potential adverse effects are due to the physical properties of some opaque agents.

Many alternatives to zinc oxide are available, some of which are not specifically opaque agents. For example, carbon black, which is an alternative opaque agent, also acts as a reinforcing agent. Other pigments may also function as both a reinforcing agent and an opaque agent when present in sufficient quantities. In these instances, the upper limit of the opaque agent will be determined by the hardness that the ingredient imparts at that level or the viscosity the agent imparts to the pourable inhibitor.

A plasticizer is added to improve the flexibility of the inhibitor and aid in its processing. The plasticizer is less viscous than the binder. More importantly, the plasticizer is added to maintain the integrity of the surface of the propellant at the centerport. A plasticizer does not bond into the matrix of a cured polymer and, therefore, is mobile. If a plasticizer is present in the propellant, an approximately equivalent amount is needed in the inhibitor. If not, the plasticizer will migrate out of the propellant into the inhibitor, or vice versa, resulting in a brittle layer of propellant immediately adjacent to the inhibitor or brittle inhibitor, respectively. Brittle layers of propellant or inhibitor are undesirable as they have a tendency to crack.

It is preferable to have the same amount and type of plasticizer in the inhibitor as is present in the propellant. Because propellants generally contain significant proportions of solids, the actual weight percentage of plasticizer in the inhibitor is calculated to have approximately equivalent parts per hundredths rubber as the propellant. When the amount of plasticizer in the inhibitor and propellant are approximately equivalent on a rubber-to-rubber basis, the plasticizer will not migrate from propellant to the inhibitor, or vice versa.

The application of the pourable inhibitor to the centerport is a simple process. The basic steps of the application are as follows: 1) the pourable inhibitor of the invention is poured into the centerport of a solid propellant rocket motor unit; 2) the unit is positioned horizontally and rotated for a period of time while the inhibitor cures and bonds to the propellant; and 3) additional coats are added as desired by repeating the process. Optional steps include pre-heating the unit or abrading the surface of the centerport to facilitate bonding prior to the application of the pourable inhibitor.

The specific amount of pourable inhibitor needed for the application of the first or subsequent coats is determined by a calculation based on the surface area of the centerport and the desired thickness of the coat of inhibitor. The centerport is typically cylindrically shaped and, therefore, the surface area is easily calculated. The thickness of the coat or coats is dependant on the specific application. In some instances, multiple coats are desirable to ensure even coverage of the inhibitor. For example, for a final thickness of 50 mils, two coats of 25 mils can be applied in succession.

For application of the example formulation, a predetermined amount of inhibitor is poured into the centerport of a unit and rotated for at least 16 hours at a temperature of 140° F. These conditions are appropriate and preferred for the application of the example formulation because it results in even distribution of the cured inhibitor that is bonded to the surface of the propellant.

Of course, the duration and temperature of the rotation will vary and are dependent on the specific formulation of inhibitor. The main factor influencing the duration and or temperature is the cure rate. If the cure rate of a particular inhibitor is relatively fast, the duration of the rotation may be decreased accordingly and vice versa. Additionally, the temperature may have some effect on the cure rate and/or bonding of the inhibitor to the surface and may be adjusted to suit the specific application.

An optional step of abrading the surface of the centerport may be performed prior to applying the first coat of inhibitor. While this step is optional, in many instances this step will be the preferred method of applying the inhibitor. Abrading the surface removes the binder rich surface of the solid propellant that is present in many typical rocket propellants. The removal of the binder rich surface facilitates the bonding of the inhibitor to the surface. Abrading is accomplished by rubbing the surface with sand paper or a similar material.

The following procedure outlines a specific set of step-by-step instructions for the preparation of and application of the pourable opaque centerport inhibitor of the example. This particular set of instructions is illustrative of the type of steps that one skilled in the art would take to practice the invention.

1) Preheat rocket motor case in 140° F. oven for 5 to 8 hours.

2) Measure the humidity in the area.

NOTE: For best results, the humidity should be less than or equal to 50 grains of moisture per pound of dry air before centerport inhibiting.

3) Remove the case from the oven.

4) Attach a 3"×5" piece of 180 grit aloxite cloth to a wooden dowel rod using masking tape. Place the case on a rotating table. Ensure that the case is grounded. With the unit rotating, abrade the propellant centerport until all sheen is gone. Clean the centerport using gauze.

5) Place the case on a horizontal work surface and remove the aft insulation neck and forward centerport ring with a sharp knife, such as an X-ACTO® knife. The insulation neck should be trimmed flush with propellant in the aft end of the case. Weigh the case and record the weight.

NOTE: Neck trimming may be performed prior to case preheat.

6) Mix approximately 107 grams of HTPB inhibitor according to the following formula:

| Ingredient | Parts by weight(gms) |
| --- | --- |
| HTPB Prebatch | 64.64 ± 2 |
| Zinc Oxide | 16.10 ± 0.5 |
| DOS | 16.02 ± 0.5 |
| N-100 | 8.42 ± 0.2 |
| DBTDL/DOS Solution* | 2.0 ± 0.1 |

*TbDBTDL/DOS solution is made by combining 198 grams of DOS with 2.00 grams of DBTDL.

7) Place the inhibitor under vacuum for a minimum of 15 minutes.

8) Install a #2 rubber stopper, covered with TEFLON® tape, into the motor forward port.

9) Position the motor on the floor with the forward end down.

10) Place 48 grams of pourable inhibitor into the aft end of the case.

11) Set the motor on a work surface and remove the rubber stopper. Allow the inhibitor to flow to the forward end of the case. When the inhibitor has covered the length of the centerport, rotate the case to cover the entire inner circumference of the propellant with the inhibitor.

12) Place the case on a rotating table. Ensure that the ground brush touches the case. If applying the second coat of the inhibitor, the case should be positioned in the opposite direction as it was during the first coat.

CAUTION: Ensure that the case is grounded.

13) Assemble shaft (08T56S), sleeve (39T029), plug (39T030), and O-ring per drawing 39A019.

14) Place plain end of shaft through hole in center of spacer (08T643) and secure with 0.250-20 UNC-2A nut and flat washer.

NOTE: Prior to installing the plug, tighten the center nut to expand the O-ring to a point, which will allow the O-ring to clean inhibitor from the propellant when the plug is installed.

15) Install the spacer and plug into the aft end of the case.

16) Secure spacer in case with locking ring (08T642).

17) Tighten the nylon nut until the O-ring is fully expanded.

18) Place the rolling table and the case in 140° F. oven for 12 hours minimum. Record date and time on M&IR.

19) Remove the rolling table and the case from the oven.

20) Loosen the nut and remove the locking ring, spacer, and plug from the case.

NOTE: The spacer and locking ring may be inseparable after being removed from the case. If so, place the parts in a freezer and allow them to contract until the spacer may be removed from the locking ring.

21) Clean the inhibitor from the plug and O-ring using acetone/alcohol and clean white rags.

22) If only one coat of inhibitor has been applied return to Step 6 and repeat the process.

NOTE: The process for the second coat of inhibitor will be identical to the process for the first step except that the case must be turned to the opposite end of the rotating table.

23) Preferably, seal both ends of the case using pink anti-static or black conductive bags and masking tape.

As shown in FIG. 1, the solid propellant rocket motor 2 includes a rocket motor case 4, a solid propellant 6 with a centerport 8, and a centerport inhibitor 10. The solid propellant 6 is positioned inside the rocket motor case 4 and the centerport inhibitor 10 is applied to the surface of the centerport 8.

While the present invention has been described in connection with an exemplary embodiment, it will be understood that many modifications will be readily apparent to those skilled in the art, and this application is intended to cover any variations thereof.

What is claimed is:

1. A pourable centerport inhibitor for a solid propellant rocket motor, consisting essentially of:
    a hydroxyl terminated polybutadiene; and
    a multifunctional isocyanate, wherein the hydroxyl terminated polybutadiene and the multifunctional isocyanate are combined to form a pourable polymeric binder that cures into an amorphous solid.

2. The pourable centerport inhibitor of claim 1, further comprising an opaque agent.

3. The pourable centerport inhibitor of claim 2, further comprising a plasticizer.

4. The pourable centerport inhibitor of claim 3, wherein the plasticizer, the hydroxyl terminated polybutadiene, and the multifunctional isocyanate are the same type used in a solid propellant.

5. A method of inhibiting a centerport of a solid propellant rocket motor, comprising:
   pouring an amount of uncured inhibitor into a centerport of a solid propellant rocket motor, wherein the uncured inhibitor consists essentially of a hydroxyl terminated polybutadiene and a multifunctional isocyanate; and
   rotating the solid propellant rocket motor in a substantially horizontal position for a period of time that allows the uncured inhibitor to cure.

6. The method of claim 5, further comprising forming a chemical bond between the uncured inhibitor and a solid propellant as the uncured inhibitor cures.

7. The method of claim 5, further comprising pouring an additional amount of the uncured inhibitor into the centerport of the solid propellant rocket motor and rotating the solid propellant rocket motor in the substantially horizontal position for a period of time that allows the additional amount of the uncured inhibitor to cure to increase a thickness of a centerport inhibitor.

8. A solid propellant rocket motor with an inhibited centerport, comprising:
   a rocket motor case;
   a solid propellant having a centerport; and
   a centerport inhibitor that consists essentially of a hydroxyl terminated polybutadiene and a multifunctional isocyanate,
   wherein the solid propellant is positioned inside the rocket motor case and wherein the centerport inhibitor is bonded to a surface of the centerport of the solid propellant in an even distribution.

9. The solid propellant rocket motor of claim 8, wherein the solid propellant and the centerport inhibitor have compatible cure systems.

10. The solid propellant rocket motor of claim 8, wherein the solid propellant and the centerport inhibitor utilize the same cure systems.

11. The solid propellant rocket motor of claim 8, wherein the solid propellant and the centerport inhibitor utilize the same cure systems and same plasticizers.

12. The solid propellant rocket motor of claim 11, wherein the plasticizer in the solid propellant and the centerport inhibitor is the same concentration on a rubber-to-rubber basis.

* * * * *